United States Patent Office

3,051,686
Patented Aug. 28, 1962

3,051,686
POLYCHLOROFORMATES
William E. Bissinger, Akron, Ohio, assignor, by mesne assignments, to Pittsburgh Plate Glass Company
No Drawing. Filed Mar. 30, 1960, Ser. No. 18,510
5 Claims. (Cl. 260—77.5)

This invention deals with novel polymers and their manufacture. It more particularly concerns polymers of olefinically unsaturated haloformates, notably chloroformates, and olefins such as ethylene.

The chemical versatility of chloroformate groups or like haloformate groups such as their reactivity with ammonia, amines, alcohols renders them valuable reactants for providing many useful products. Of special interest in this regard are polyfunctional chloroformates, e.g., compounds having a multiplicity of reactive chloroformate groups. Polyfunctional chloroformates, particularly those having three or more chloroformate groups per molecule, are useful in the preparation of three-dimensional polymers by cross-linking through the reactivity of the chloroformate group.

In accordance with this invention, novel polyfunctional interpolymers of unsaturated chloroformates, e.g., allyl chloroformate, and olefins such as ethylene are provided having a multiplicity of reactive chloroformate groups, usually upwards of three and often ten or sometimes fifteen or more. These interpolymers are principally linear in character and have recurring reactive chloroformate groups. Many of the preferred interpolymers have as their principal linear structure a carbon chain including carbon atoms to which are linked through recurring methylene groups reactive chloroformate groups, e.g., the polymers contain the recurring methylchloroformate pendant groups,

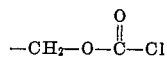

By virtue of their polyfunctionality, these polychloroformate polymers are convertible into three-dimensional, thermosetting, cross-linked polymers by reaction with appropriate polyfunctional materials including polyfunctional alcohols and amines. Thus, polyfunctional, usually difunctional, materials such as diols (aliphatic or aromatic) or diamines may be reacted with these polychloroformate polymers in the provision of three-dimensional polymers. The reactivity of the chloroformate and —OH or amino groups provides carbonate or carbamate linkages for realizing such cross-linking. Other polymers are prepared from the novel polychloroformate interpolymers by reaction with an alcohol or amine having a polymerizable functionality such as an olefinically unsaturated alcohol or amine, or an epoxy alcohol (glycidol) and polymerization of the reaction products via the unsaturation or other polymerizable functionality provided from the alcohol or amine.

Three-dimensional polymers, above described, are useful in providing surface finishes. They thus may be used to coat protectively various surfaces such as wood, metal including iron, copper and steel, natural and synthetic cellulosic sheeted and woven materials such as paper, cotton textiles and the like, by effecting in situ the conversion of the polychloroformate or a polymerizable derivative thereof to three-dimensional polymers.

Preferred polychloroformate interpolymers are those of allyl chloroformate and ethylene. Among such interpolymers are those which contain from about 5 to 85 percent allyl chloroformate moieties by weight and have chloroformate chlorine contents ranging from 1 to 25 weight percent. Their cryoscopic molecular weights typically vary from 500 to 3500.

Of these interpolymers, those having more than about 50 percent allyl chloroformate moieties by weight are generally viscous liquids or semisolids and are readily soluble in acetone, dioxane, methylene chloride, benzene and other aromatics including xylene and toluene. Others containing lesser allyl chloroformate contents are waxy solids sparingly soluble in benzene or dioxane.

These interpolymers have as an important component of their principal chain a recurring moiety,

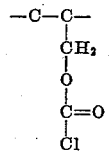

By reaction with compounds having polyfunctional reactivity with respect to chloroformate groups, three-dimensional, thermosetting polymers are prepared.

Thus, using dihydroxy compounds, the interpolymers of allyl chloroformate and ethylene are cross-linked yielding three-dimensional polymers having as an identifying configuration:

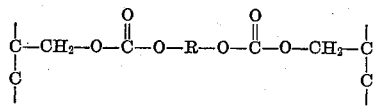

wherein R denotes the residue of the dihydroxy compound. At least one such cross-linking structure is present, and usually most of the polymers include a multiplicity thereof corresponding approximately to the number of chloroformate groups present in the copolymer. These three-dimensional polymers may, accordingly, be described as polyesters of (a) a biscarbonic acid of a dihydroxy compound and (b) a polyhydric interpolymer of allyl alcohol and ethylene.

Dihydroxy compounds (or diols) include glycols such as diethylene glycol, ethylene glycol, propylene glycol, polyalkoxy glycols, etc.; xylylene glycols, catechol, resorcinol, and the alkylidene bisphenols, e.g., Bisphenol A.

With reactive diamines (e.g., those having available hydrogens linked to two of their amino nitrogens), the cross-linking structure is representable as:

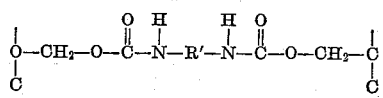

R' denoting the residue of a diamine among which are ethylene diamine, isopropylene diamine, trimethylene diamine, piperazine, hexamethylene diamine, diaminobenzenes, toluene diamine, alkylidene dianilines, and the like. Cross-linking is achieved by virtue of two carbamate groups and the three-dimensional polymers may be regarded as polyesters of (a) a dicarbamic acid and (b) a polyhydric interpolymer of ethylene and allyl alcohol wherein hydroxyl groups of the interpolymer are esterified with carbamic acid groups.

Mixed esters of carbonic and carbamic acids are obtained through the use of compounds having both amine and hydroxyl functionality such as ethanolamine and diethanolamine. For example, by reaction of ethanolamine with the polychloroformate, there is formed a polymer having a cross-linking structure representable as:

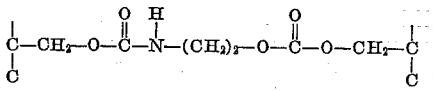

More complex polymers of the polychloroformates result from their reaction with trifunctional, tetrafunctional, etc., alcohols, amines or mixed alcohol-amines as illustrated by glycerin, trimethylolethane, pentaerythritol and diethanolamine.

Besides —OH and amino groups, the polychloroformate polymers are reactive with other compounds having polyfunctional reactivity with respect to chloroformate groups to yield cross-linked polymers. Such compounds (including polymeric materials) are those containing a plurality of groups having active hydrogen (a hydrogen of the type which is linked directly to a nitrogen, sulfur or oxygen atom) and include besides those already mentioned mercaptans corresponding to the diols such as 1,2-ethanedithiol.

The interpolymers herein contemplated including the preferred interpolymers of ethylene and allyl chloroformate are prepared by interpolymerizing an olefin and a chloroformate of an unsaturated alcohol, usually in a liquid diluent under pressure and with the aid of a catalyst such as diisopropyl peroxydicarbonate or like esters such as are described in United States Letters Patent 2,370,588, granted February 27, 1945. Olefins such as ethylene are normally gaseous and hence copolymerization is conducted by recourse to a liquid diluent in which the olefin is dissolved.

The following examples illustrate the copolymerization of ethylene and allyl chloroformate to produce polychloroformate polymers.

*Example I*

A series of ethylene-allyl chloroformate interpolymers are prepared by mixing allyl chloroformate, anhydrous benzene (thiophene free) and diisopropyl peroxydicarbonate in a glass-lined autoclave having a capacity of 300 milliliters in amounts as listed in Table I. The autoclave contents are flushed twice with high purity ethylene (99.5 percent pure ethylene except in Run B where it was 99.9 percent pure ethylene) to displace air, then rocked and filled with ethylene at full superatmospheric cylinder pressure at room temperature (about 25° C.). After the contents of the autoclave are saturated with ethylene, the contents of the closed autoclave are gradually raised by heating over a period of 30 minutes to the temperature specified in Table I. With rising temperatures, pressure increases. As the reaction proceeds, additional ethylene is added whenever superatmospheric pressure drops below the initial full cylinder pressure.

After no further decrease in pressure is observed, the autoclave contents are allowed to cool to room temperature and the contents treated to separate solvent, any unreacted monomer and other materials by heating the reaction mixture under nitrogen to 40° C. at 4 millimeters of mercury vacuum.

The following Table I lists the details of various preparations of copolymers in accordance with the foregoing procedure:

In lieu of allyl chloroformate, other chloroformates of unsaturated alcohols may be used in the foregoing example to produce polychloroformate interpolymers. Thus, allyl chloroformate may be replaced by the chloroformates of 1-butene-4-ol, 2-butene-1-ol, methylvinylcarbinol, ethylvinylcarbinol, dimethylpropenylcarbinol, beta-allylethyl alcohol, allylmethylcarbinol, cyclopentene-3-ol, cyclohexene-3-ol, and like olefinically unsaturated alcohols, including methallyl alcohol, chloroallyl alcohol, and 1-chlorobutene-3-ol-2. The process described in United States Letters Patent 2,476,637, granted July 19, 1949, is appropriate for preparing chloroformates of these and other useful unsaturated alcohols. Generally useful are chloroformates of unsaturated alcohols having a polymerizable unsaturated group, preferably olefinic unsaturation, and an alcoholic hydroxyl group attached to an aliphatic carbon.

Interpolymers of unsaturated chloroformates and olefinically unsaturated materials other than ethylene are contemplated. Thus, ethylene may be partially or completely replaced by propylene, butadiene, butene-1, butene-2, isobutylene, pentene-1, 2-methylbutene-1, hexene-1, octene-1, styrene, acrylonitrile, by way of illustration.

Interpolymer polychloroformates so provided may be converted into three-dimensional polymers or higher molecular weight products in the manner herein described in detail with respect to allyl chloroformate-ethylene interpolymers.

As indicated by the details given in the experiment, the interpolymerization of the chloroformate of an unsaturated alcohol such as allyl alcohol and ethylene or like olefinic hydrocarbon is initiated by recourse to certain catalysts exemplified by isopropyl peroxydicarbonate and other peroxydicarbonate esters heretofore mentioned. Other free radical initiators such as benzoyl chloride, azo-isobutyronitrile, acetyl peroxide, t-butyl peroxide, etc., also may be used.

Formation of interpolymers proceeds with most facility in an organic liquid medium. Organic solvents for the reactants are thus employed in providing a proper reaction medium. Moreover, since the interpolymers are at least sparingly soluble in benzene and often reasonably soluble in benzene and other aromatics, aromatic solvents, especially those with appropriate chain transfer constants, provide suitable media in which to conduct polymerization. However, other essentially inert organic liquids, especially those in which the reactants are adequately soluble, include chlorinated aliphatic hydrocarbons such as methylene chloride, dichloroethane, hydrocarbons including cyclohexane, toluene, heptane, octane, etc.

*Table I*

| Run | ACF,[1] grams | IPP,[2] grams | Benzene, milliliters | Pressure, p.s.i.g. Initial | Pressure, p.s.i.g. Maximum | Temperature, ° C. | Yield, grams | Chloroformate Chlorine, Percent | Molecular Weight [3] | Weight Percent ACF[1] in Polymer | Nature | Average Number of ACF[1] Units per Chain |
|---|---|---|---|---|---|---|---|---|---|---|---|---|
| A | 20.3 | 2.2 | 72 | 690 | 830 | 53 | 27.7 | 12.3 | 2,275 | 41.8 | semi-solid | 7.9 |
| B | 20.3 | 2.2 | 72 | 700 | 975 | 53 | 35.1 | 11.8 | 2,080 | 40.1 | do | 7.0 |
| C | 20.3 | 2.2 | 72 | 650 | 730 | 40 | 31.1 | 12.0 | 1,915 | 40.7 | do | 6.6 |
| D | 20.3 | 4.4 | 72 | 630 | 830 | 53 | 32.3 | 10.9 | 2,900 | 37.0 | do | 8.9 |
| E | 5.7 | 2.2 | 85 | 670 | 820 | 53 | 25.1 | 4.8 | 2,470 | 16.3 | white waxy solid | 3.3 |
| F | 3.4 | 2.2 | 87 | 600 | 830 | 53 | 19.1 | 1.7 | | 5.8 | do | |
| G[4] | 51.9 | 7.3 | 239 | 875 | 975 (40°) 850 (50°) | 40–50 | 117.0 | 10.8 | 2,190 | 36.7 | yellowish white semi-solid | 6.7 |
| H[4] | 21.1 | 6.8 | 261.3 | 740 | 2,350 (40°) 850 (50°) | 40–50 | 114.5 | 3.3 | | 11.2 | white powder | |
| I[4] | 126.6 | 6.8 | 168 | 740 | 800 (40°) 900 (50°) | 40–50 | 132.7 | 18.1 | 2,070 | 61.4 | viscous liquid | 10.6 |

[1] ACF denotes allyl chloroformate.
[2] IPP denotes isopropyl peroxydicarbonate.
[3] As determined by cryoscopic method in benzene.
[4] Autoclave capacity 1000 milliliters.

Superatmospheric pressures are imposed upon the liquid medium in which polymerization is conducted, especially when using a gaseous monomer, notably the olefin monomer. Depending upon the temperature at which polymerization is conducted, the particular solvents and particular olefins, etc., considerable variation in superatmospheric pressure is possible. As a rule, pressures in excess of about 600 pounds per square inch gauge up to 5000 pounds per square inch gauge or somewhat higher are typical of those used most often. This, however, does not preclude the use of still higher pressures, although practicalities rarely dictate recourse to unusually high pressures.

Polychloroformate interpolymers of an unsaturated chloroformate and olefinic hydrocarbon (or olefinic chlorohydrocarbon) are reactive with monohydroxy or dihydroxy compounds, either saturated or unsaturated, amines and diamines, ammonia, pyridine, sodium hydroxide, or like alkalis, to produce polymeric materials having a plurality of carbonate and/or carbmate groups. Thus, reaction of the polychloroformate interpolymers here provided with a hydroxy compound such as an alcohol yields polycarbonates. A polymerizable polycarbonate having polymerizable olefinic unsaturation is attained by reaction of the polychloroformate polymer with an unsaturated polymerizable alcohol such as allyl alcohol. The resulting polycarbonates are useful as casting resins in the formation of optically clear plastic sheets such as are useful in lieu of glass where the breakability of glass is undesirable. Other polymerizable polycarbonates are attainable by reaction of glycidol (or epoxy alcohols) with the polychloroformate. They are polymerizable via their multiplicity of epoxy groups.

The following example illustrates the manner in which polychloroformate polymers are converted into polymerizable polycarbonates:

EXAMPLE II

Some 2 moles of redistilled alcohol, 0.7 mole of pyridine, and 250 cubic centimeters of redistilled toluene are placed in a round bottom glass reaction flask equipped with a mechanical stirrer, a thermometer and a dropping funnel. To this well stirred solution maintained at a temperature of about 8° C., a toluene solution containing 98 grams of the interpolymer of Run I in Table I is added. After completing the addition and stirring overnight, the reaction medium is water washed using sodium carbonate to reduce emulsification. Some 78.6 grams of a viscous yellow liquid polycarbonate having a chloroformate chlorine content of about 0.2 percent by weight and a $CO_2$ content of 21.4 percent by weight are obtained. The olefinic unsaturation content of this polycarbonate determined as allyl alcohol is 29.1 weight percent.

A casting of this polycarbonate is prepared by curing (or further polymerizing) the polycarbonate for 72 hours at 70° C. in the presence of 5 percent by weight of benzoyl peroxide. A white opaque solid of substantial surface hardness was obtained.

Besides polymerizing olefinically unsaturated chloroformates and olefin hydrocarbons, olefin halohydrocarbons and especially olefin chlorohydrocarbons give rise to polychloroformate polymers containing substantial chlorine other than chloroformate chlorine. The presence of this chlorine in the polymer renders it flame resistant and hence useful for reaction with alcohols, amines and the like in the formation of higher molecular weight polymers suitable for imparting flame resistance. These higher molecular weight polymers may be employed to impregnate textiles such as woven cotton, wools and the like to impart flame resistant properties.

The following example illustrates the copolymerization of an olefin chlorohydrocarbon and an olefinically unsaturated chloroformate:

EXAMPLE III

A round bottom glass flask fitted with a condenser closed with a vent is charged with 41.3 grams (0.314 mole) of trichloroethylene, 27.2 grams (93.2 percent by weight pure, 0.209 mole) of allyl chloroformate and 1.2 grams of isopropyl peroxydicarbonate. After the flask is flushed with nitrogen, its contents are heated to 45° C. for a period of 77 hours.

The interpolymer is recovered from the resulting reaction medium in the amount of 34.4 grams by subjecting the reaction mixture to vacuum distillation under a nitrogen path using a pot temperature of 65° C. and 3 millimeters of mercury pressure.

The cryoscopic molecular weight in benzene of this polymer is 625. Its chloroformate chlorine content is 18.2 percent by weight and it contains a total of 48.2 percent chlorine. Some 61.8 percent by weight of the polymer is provided by the allyl chloroformate monomer. The copolymer is readily soluble in benzene.

In general, the better copolymers of olefinic chlorohydrocarbons and unsaturated chloroformate, e.g., those containing higher chlorine contents, are attained by employing some 60 parts by weight of the chlorohydrocarbon basis 100 parts by weight of the two monomers.

Besides trichloroethylene, other olefinic halohydrocarbons including mixed halohydrocarbons, e.g., chlorofluorohydrocarbons, may be copolymerized with unsaturated chloroformates to provide useful polymeric materials. Other olefinic halohydrocarbons which may be mentioned include the dichloroethylenes (cis and trans), 1,1-dichloro-2-fluoroethylene, 3,3,3-trichloro-1-propene, 1,2-difluoroethylene, and longer carbon chain halohydrocarbons, usually including those having up to eight aliphatic carbons.

While the present invention has been described by reference to specific details of certain embodiments, it is to be understood that it is not intended that the invention be construed as limited to such details except insofar as these details appear in the appended claims.

I claim:

1. An interpolymer of (A) an olefinically unsaturated chloroformate and (B) a compound selected from the group consisting of aliphatic olefinically unsaturated hydrocarbons and aliphatic olefinically unsaturated halohydrocarbons, said interpolymer containing a multiplicity of reactive chloroformate groups and containing from 5 to 85 percent olefinically unsaturated chloroformate moieties, by weight, based upon the combined weight of said (A) olefinically unsaturated chloroformate moieties and of (B) said compound selected from said group.

2. An interpolymer of (A) a monoolefinically unsaturated chloroformate and (B) a compound selected from the group consisting of aliphatic olefinically unsaturated hydrocarbons and aliphatic unsaturated halohydrocarbons, said interpolymer containing a multiplicity of reactive chloroformate groups and containing from 5 to 85 percent monoolefinically unsaturated chloroformate moieties, by weight, based upon the combined weight of said (A) monoolefinically unsaturated chloroformate moieties and of (B) said compound selected from said group.

3. An interpolymer of (A) allyl chloroformate and (B) ethylene, said interpolymer containing a multiplicity of reactive chloroformate groups and containing from 5 to 85 percent allyl chloroformate moieties, by weight, based upon the combined weight of said (A) allyl chloroformate moieties and of (B) ethylene.

4. An interpolymer of (A) allyl chloroformate and (B) ethylene, said interpolymer containing from 1 to 25 percent by weight of chloroformate chlorine and containing from 5 to 85 percent allyl chloroformate moieties, by weight, based upon the combined weight of said (A) allyl chloroformate moieties and of (B) ethylene.

5. An interpolymer of (A) a monoolefinically aliphatic unsaturated chloroformate and (B) an aliphatic olefinically unsaturated halohydrocarbon having up to 8 carbon atoms, said interpolymer containing a multiplicity of reactive chloroformate groups and containing from 5 to 85 percent monoolefinically aliphatic unsaturated chloroformate moieties, by weight, based upon the combined weight of said (A) monoolefinically aliphatic unsaturated chloroformate moieties and of said aliphatic olefinically unsaturated halohydrocarbon.

References Cited in the file of this patent

UNITED STATES PATENTS

| | | |
|---|---|---|
| 2,377,085 | Kung | May 29, 1945 |
| 2,440,090 | Howk et al. | Apr. 20, 1948 |
| 2,464,056 | Pechukas | Mar. 8, 1949 |

FOREIGN PATENTS

| | | |
|---|---|---|
| 522,654 | Canada | Mar. 13, 1956 |